US 6,609,753 B2

(12) United States Patent
Schmidt-Schaeffer

(10) Patent No.: US 6,609,753 B2
(45) Date of Patent: Aug. 26, 2003

(54) RECLINING PASSENGER SEAT WITH ADJUSTABLE CUSHIONING PROPERTIES

(75) Inventor: Tobias Schmidt-Schaeffer, Stuttgart (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/991,014

(22) Filed: Nov. 15, 2001

(65) Prior Publication Data

US 2002/0060484 A1 May 23, 2002

(30) Foreign Application Priority Data

Nov. 17, 2000 (DE) .......................... 100 57 208

(51) Int. Cl.[7] .............................................. A47C 3/025
(52) U.S. Cl. .............................. 297/284.2; 297/354.13; 297/423.2
(58) Field of Search .......................... 297/284.1, 284.2, 297/284.11, 354.13, 423.19, 423.2

(56) References Cited

U.S. PATENT DOCUMENTS

| 280,004 A | * | 6/1883 | Bakewell |
| 4,858,992 A | * | 8/1989 | LaSota |
| 4,921,301 A | * | 5/1990 | Haynes |
| 5,194,311 A | | 3/1993 | Baymak et al. |
| 5,829,836 A | | 11/1998 | Schumacher et al. |
| 6,193,318 B1 | | 2/2001 | Becker et al. |

FOREIGN PATENT DOCUMENTS

DE  19828254  1/2000

* cited by examiner

Primary Examiner—Milton Nelson, Jr.
(74) Attorney, Agent, or Firm—W. F. Fasse; W. G. Fasse

(57) ABSTRACT

A reclinable seat includes a seat bottom with a seat frame, and a backrest with a backrest frame pivotably connected to the seat bottom to be adjustable to an upright seating configuration and a reclined lying configuration. The seat bottom includes a support arrangement having an adjustable firmness. A firmer support is provided in the upright seating configuration, and a softer support is provided in the reclined lying configuration. In the support arrangement, seat support rods extend across the seat bottom and are pivotably supported on the seat frame. A shaft is connected to the backrest frame. Straps are connected to the shaft and to each of the seat support rods while weaving over and under the rods. When the recline angle of the backrest is adjusted, the shaft rotates and either pulls or slackens the straps to pivot the support rods between a firmer orientation and a softer orientation.

18 Claims, 4 Drawing Sheets

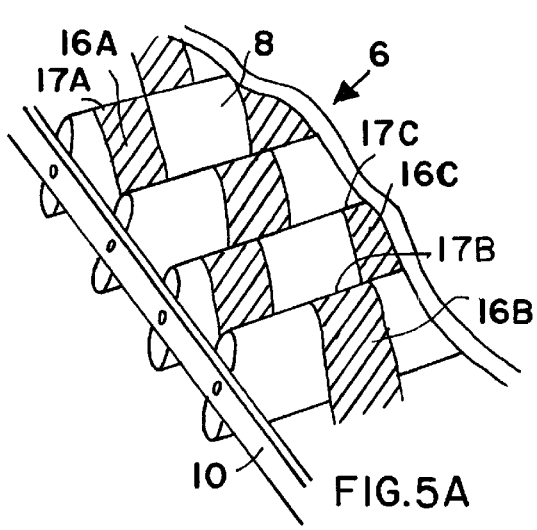
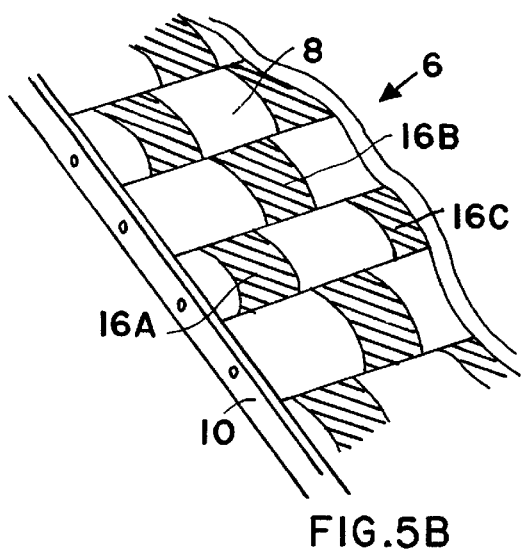
FIG.5A  FIG.5B
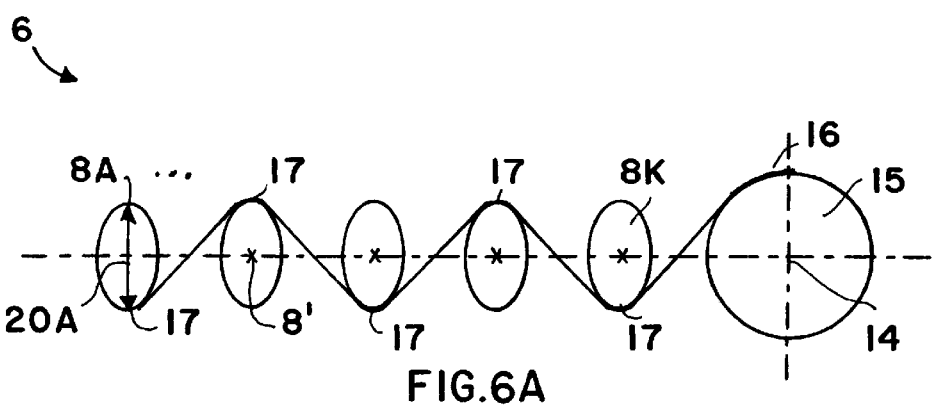
FIG.6A
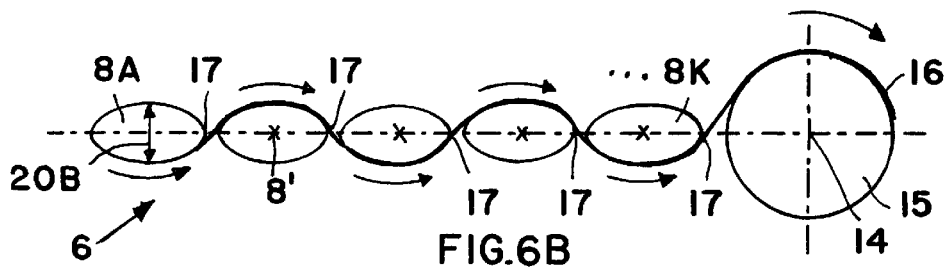
FIG.6B
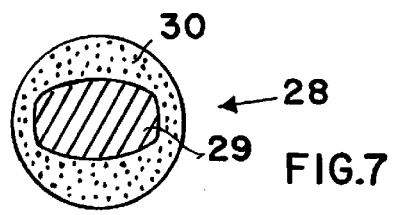
FIG.7

RECLINING PASSENGER SEAT WITH ADJUSTABLE CUSHIONING PROPERTIES

PRIORITY CLAIM

This application is based on and claims the priority under 35 U.S.C. §119 of German Patent Application 100 57 208.1, filed on Nov. 17, 2000, the entire disclosure of which is incorporated herein by reference.

FIELD OF THE INVENTION

The invention relates to a seat, and especially a passenger seat with an adjustably reclinable backrest, including a seat bottom with a seat frame and a backrest with a backrest frame connected to the seat bottom. In general in this application, the term "seat" applies to any seat, chair, couch, recliner, sleeper seat, chaise longue, lounge chair, or the like on which a person may sit, recline, lie, or otherwise rest.

BACKGROUND INFORMATION

German Patent 198 28 254 discloses a seat arrangement having a backrest including a backrest frame adjustably connected to a seat bottom including a seat frame. This known seat arrangement is intended to provide an anatomically improved support for a person sitting thereon, and is to be adaptable to the seated stature and position of the body of the seated person. To achieve these features, the known seat arrangement includes a base member of a corrugated sheet of spring metal, of which the corrugation extends in the longitudinal direction of the seat, and which is stiff in a crosswise direction, but flexible in a lengthwise direction. The base member, which is stiff crosswise and flexible lengthwise, is hangingly supported in a carrier frame, and is adjusted or adapted corresponding to the individual seating desires of the person seated on the seat arrangement. In other words, in response to varying seated positions or postures, the base member moves or repositions itself corresponding to the respective seating position or posture.

Thus, it is known from the above German Patent reference, to provide a possible adaptation to various seated postures or positions by means of the springy element used as a base member. However, the known seat arrangement does not provide an adjustment or adaptability of the spring cushioning or support firmness of the seat bottom responsive and corresponding to a seated condition or a lying condition of the person resting on the seat.

When a person is seated relatively upright on a seat arrangement, the entire body weight of the person is distributed and supported on a relatively small support surface. On the other hand, when a seat arrangement is reclined and a person reclines or lies on the reclined seat arrangement, then the person's body weight is distributed over a relatively much larger support surface area. Thus, for a relatively upright seat configuration, the spring support or cushioning of the seat bottom surface must be correspondingly harder, firmer or stiffer than for a reclined or lying configuration of the seat arrangement, to provide a comfortable support in both configurations.

If a reclinable passenger seat is equipped to provide a reclined lying function, yet has a seat bottom cushioning that is relatively hard and adapted to provide a proper support for a sitting passenger, then it may be uncomfortable for a passenger and lead to back pains or the like, if the passenger lies in a reclined position on the seat for an extended time. On the other hand, if the seat bottom cushion is made relatively softer and thereby adapted to a reclined or lying position of the seat and the passenger, then the ergonomic requirements for proper upright seated support are not met, and the seat may become uncomfortable for the passenger particularly during a long upright seated phase, for example during long distance flights.

SUMMARY OF THE INVENTION

In view of the above, it is an object of the invention to provide a seat arrangement having a backrest that is reclinably connected to a seat bottom, for supporting a person sitting, reclining or lying thereon, whereby this seat arrangement is adaptable to provide an optimal comfort both when the person is sitting and when the person is lying on the seat arrangement, and also in view of ergonomic issues. The invention further aims to avoid or overcome the disadvantages of the prior art, and to achieve additional advantages, as apparent from the present specification.

The above objects have been achieved according to the invention in a seat arrangement comprising a seat bottom including a seat frame, and a backrest including a backrest frame that is reclinably connected to the seat bottom. Particularly according to the invention, the seat bottom further includes a seat bottom support and cushioning arrangement within the seat frame, and a mechanism for adjusting the cushioning stiffness of the seating surface, from a relatively hard or firm stiffness for when the seat arrangement is in a relatively upright seating configuration, to a relatively soft stiffness for when the seat arrangement is in a reclined configuration.

Advantageously according to the invention, the firmness of the seat surface is optimally adapted to the particular configuration of the seat arrangement that is selected at any time. When the seat arrangement is configured in the normal upright sitting configuration, the seat surface is adjusted to a relatively harder or firmer or stiffer characteristic, to provide proper support over the relatively small support surface area for a person seated on the seat arrangement. On the other hand, when the seat arrangement is configured in the reclined configuration, the seat surface is adjusted to a relatively softer characteristic, so as to provide a comfortable surface for the person to lie on the seat arrangement in the reclined configuration. It is especially advantageous that the adjustment of the seat bottom cushioning and support characteristic in this manner can be achieved without great effort, and preferably in an automatic manner linked responsively to the reclining adjustment of the backrest.

BRIEF DESCRIPTION OF THE DRAWINGS

In order that the invention may be clearly understood, it will now be described in connection with example embodiments, with reference to the accompanying drawings, wherein:

FIG. 5A is a perspective view of a portion of the seat bottom support and cushioning arrangement according to the invention, as it is adjusted for the upright seating configuration;

FIG. 5B is a view of the arrangement of FIG. 5A, but adjusted for the reclining or lying configuration;

FIG. 6A is a simplified schematic side view of the arrangement and configuration of FIG. 5A;

FIG. 6B is a simplified schematic side view of the arrangement and configuration of FIG. 5B; and FIG. 7 is a schematic cross-section of an optional alternative embodiment of a support and cushioning rod or lamellae.

DETAILED DESCRIPTION OF PREFERRED EXAMPLE EMBODIMENTS AND OF THE BEST MODE OF THE INVENTION

Figure 1:
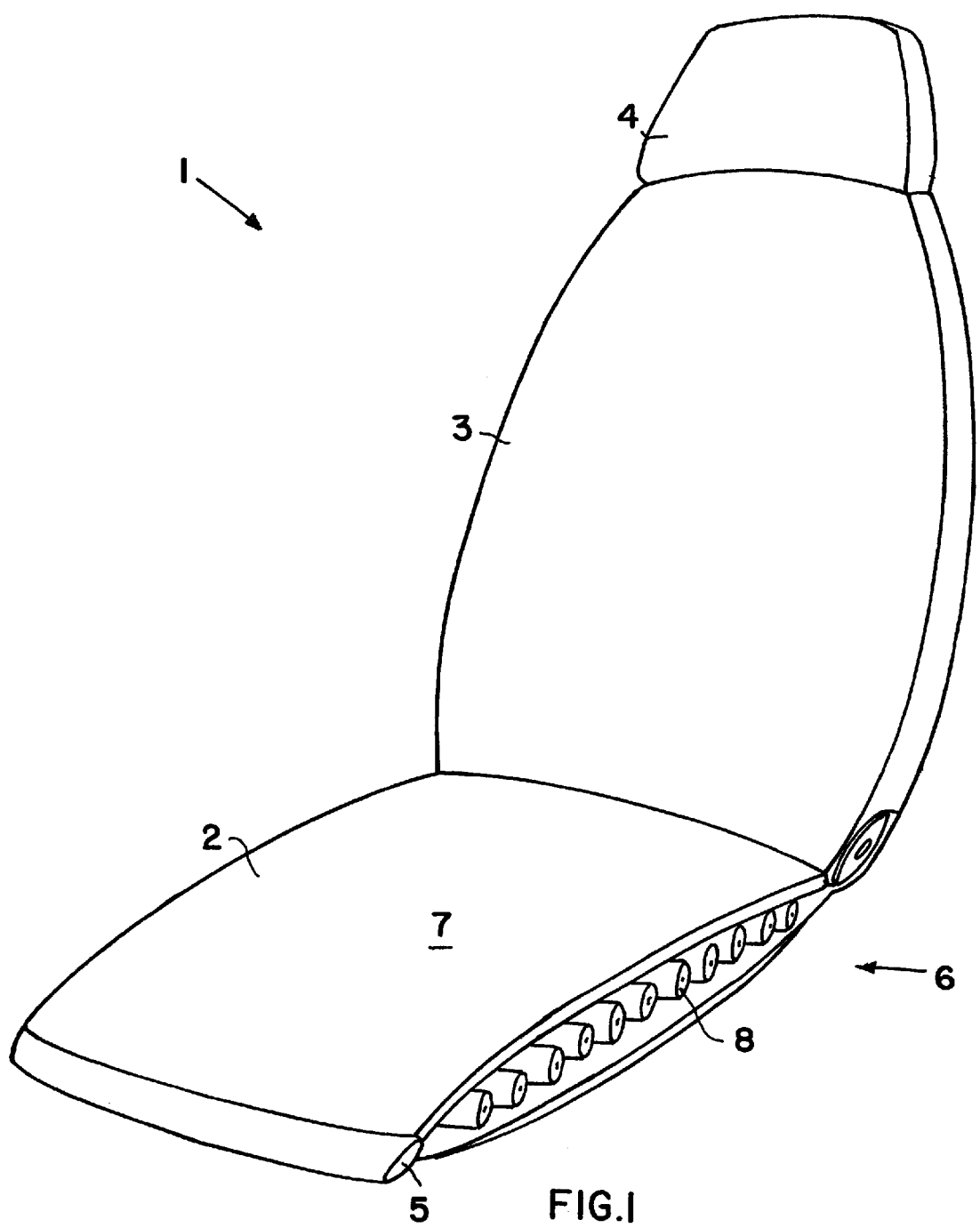
FIG. 1 is a schematic perspective view of a passenger seat arrangement according to the invention in an upright seating configuration, whereby a portion of the seat arrangement has been sectioned open for illustrating the inventive seat bottom support and cushioning arrangement.
Figure 2:
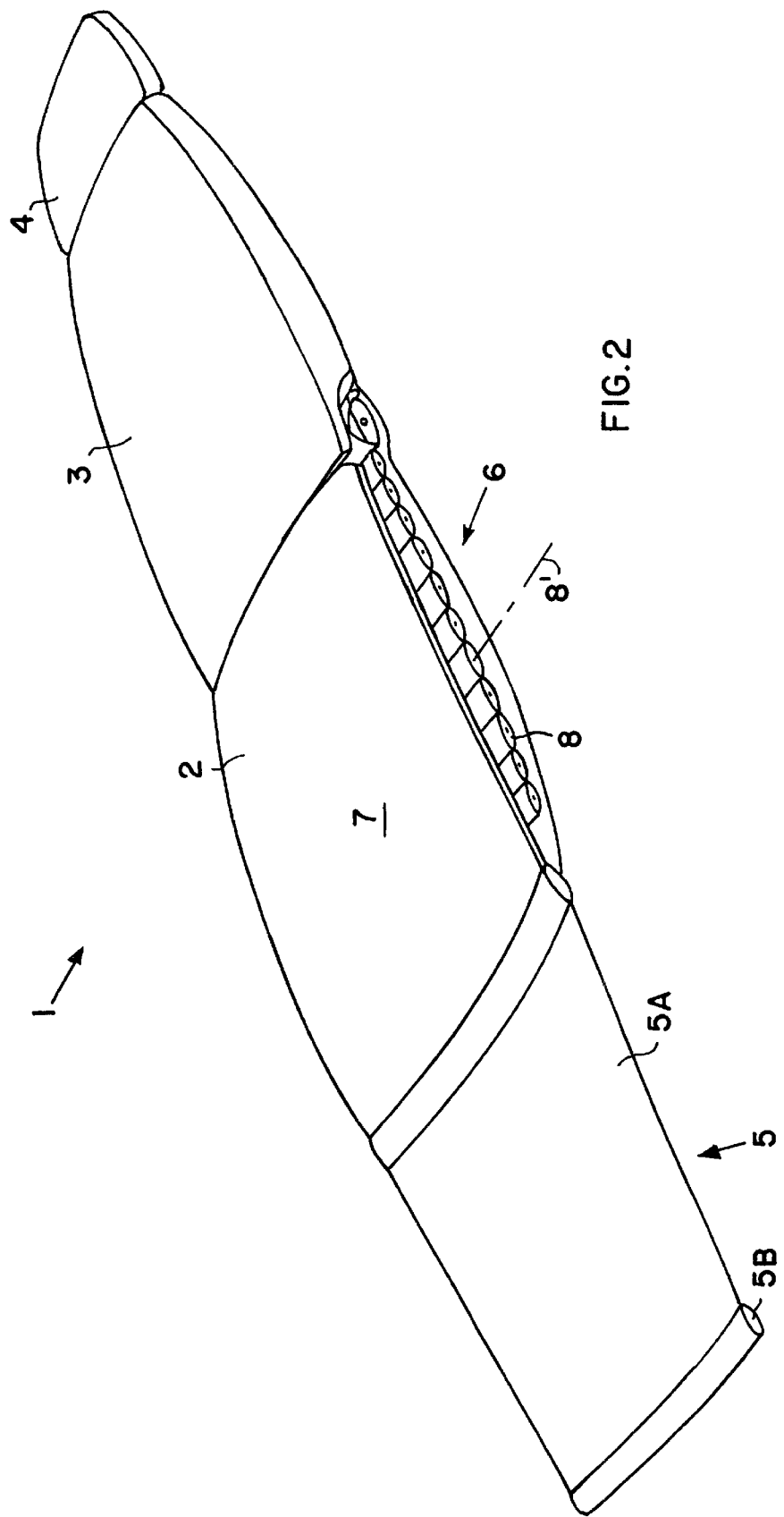
FIG. 2 is a schematic perspective view of the passenger seat arrangement according to FIG. 1, but adjusted to the reclining or lying position.

In a perspective view, FIGS. 1 and 2 show a representative example of a seat arrangement 1 according to the invention, which essentially comprises a seat bottom 2 and an adjustable, reclinable backrest 3. Such a seat arrangement 1 is, for example, especially a reclinable passenger seat in a passenger transport vehicle such as an aircraft, train, bus, ship, or the like. Alternatively, such a seat arrangement may be used as household or commercial furniture, basically in any situation in which a seat arrangement is to provide adjustability between a relatively upright seating configuration as shown in FIG. 1 and a relatively reclined lying configuration as shown in FIG. 2. A base for mounting and securing the seat arrangement 1 on a floor is not shown, because it can be embodied according to any conventional solutions known in the prior art, which may differ depending on the particular application or installation of the seat arrangement 1.

To provide improved comfort, especially when the seat arrangement 1 is adjusted to the reclined lying configuration with the backrest 3 reclined rearwardly as shown in FIG. 2, the seat arrangement 1 may further comprise a headrest or support 4 and/or a footrest or leg support 5, which respectively support the head and the legs and/or feet of a passenger in the reclined lying configuration, to provide fully relaxed comfort and resting support for the passenger. As can be seen by comparing FIGS. 1 and 2, the footrest 5 is arranged on the forward edge of the seat bottom 2, and can be extended, for example by being unrolled in the manner of a window roller shade, whenever it is needed. The footrest 5 thus comprises a durable and wear-resistant woven fabric 5A, for example a synthetic woven fabric 5A, mounted on an extendable frame or bail 5B.

The seat bottom 2 includes a seat bottom support and cushioning arrangement 6 that is preferably covered or upholstered with a seat pad element 7. According to the invention, the support and cushioning arrangement 6 provides an adjustable support and cushioning stiffness. Since the entire body weight of a passenger seated on the seat arrangement 1 in the upright seating configuration shown in FIG. 1 is distributed and supported over a relatively small support surface area, while the body weight of the passenger is distributed over a much larger surface area while lying on the seat arrangement 1 in the reclined lying configuration shown in FIG. 2, it is necessary that the seat bottom support and cushioning arrangement 6 of the seat bottom 2 is relatively harder, firmer or stiffer in the seating configuration shown in FIG. 1 and relatively softer or more resilient in the reclined lying configuration shown in FIG. 2.

This adjustability is especially desirable because a single fixed stiffness or hardness of the support and cushioning arrangement is not suitable and not comfortable for both configurations. Namely, if a fixed relatively hard support and cushioning arrangement is provided appropriately for the upright seating configuration of FIG. 1, then such a seat would feel too hard and would be uncomfortable and could cause back pains or the like when a passenger lies in a reclined position on such a seat for an extended duration. On the other hand, if a single fixed soft support and cushioning property is provided, which is appropriate for the reclined lying configuration of the seating arrangement, then such a seat would be too soft and thus uncomfortable for a passenger sitting thereon in the upright seating configuration for an extended time period.

In view of the above, the invention provides that the support and cushioning resiliency of the seat bottom support and cushioning arrangement 6 is adjustable depending on the desired seating or lying function, in order to achieve the greatest comfort and contentment of the passenger who will be using the seat arrangement 1 for sitting, as well as reclining or lying, for an extended duration, for example during a long distance flight. Particularly, the invention realizes the ergonomic requirements for such adaptable comfort even in the restricted space available in an aircraft or the like. The adjustable support and cushioning resilience is achieved in this embodiment, in that the seat bottom support and cushioning arrangement 6 comprises a plurality of elongated seat cushion support rods or lamellae 8, which respectively extend crosswise relative to the longitudinal direction of the seat arrangement 1, and which exhibit a differing elastic resilience or spring stiffness characteristic corresponding to the selected function of the seat arrangement 1, namely either upright sitting or reclined lying.

The elongated seat cushion support rods or lamellae 8 respectively are elongated rods or struts each having a cross-sectional profile shape such that an adjustment of these rods can respectively achieve different flexibility or stiffness characteristics of these rods. For example, the rods may each have a rectangular, oval, elliptical, ellipsoidal, oblong, web-like or other cross-sectional shape with anisotropic properties, e.g. with a longer major sectional axis 20A and a shorter minor sectional axis 20B.

In the present embodiment, the exemplary shape of the cross-section of each individual seat cushion support rod or lamellae 8 is generally elliptical. FIGS. 1 and 6A show how a relatively harder or stiffer support characteristic of the seat bottom surface can be achieved by adjusting the seat cushion support rods or lamellae 8 so that they are standing with the larger major sectional axis 20A oriented vertically. On the other hand, FIGS. 2 and 6B show how pivoting or rotating the seat cushion support rods or lamellae 8 about their longitudinal axes 8' into a flat arrangement in which the major sectional axes 20A are all horizontally oriented achieves a softer support characteristic because the seat cushion support rods or lamellae 8 are less stiff and more easily flexible in this orientation.

It is apparent that the above described variable support or variable stiffness characteristic can be achieved using seat support rods or lamellae 8 respectively having any cross-sectional shape with a larger major axis 20A and a smaller minor axis 20B (see e.g. FIGS. 6A and 6B). A seat cushion support rod or lamella 8 having such a cross-sectional shape will be relatively stiffer to forces applied parallel to the major axis 20A, and relatively softer or more flexible to forces applied parallel to the minor axis 20B. Thus, the major axis 20A can be regarded as a stiffer or firmer axis, and the minor axis 20B can be regarded as a more-flexible or softer axis.

Alternatively, it is even possible to use a seat cushion support rod or lamella 8 having a cross-section with a uniform circular exterior, as long as the resulting rod has anisotropic stiffness characteristics identified with a stiffer axis and a more-flexible axis. This can be achieved if the material making up the rod or lamella 8 has anisotropic properties, e.g. being made up of a fiber reinforced composite with oriented strength properties, so that the lamella 8 is softer as to bending in one direction, but stiffer as to bending in another direction. Another alternative is to provide an internal sectional configuration that achieves the above described anisotropic stiffness characteristics, i.e. to establish a stiffer characteristic in one direction and a softer characteristic in another direction.

Another option is to provide a support rod or lamella 28 including a support core 29 with an anisotropic cross-section similar to the support rods 8 discussed above, covered by a non-uniform cushioning layer 30 on the outer surface thereof, as shown in FIG. 7. The cushioning layer 30 provides a differing degree of cushioning on different sides of the lamella 28. For example, a lamella 28 may have a core 29 with an elliptical or oblong cross-section, and a synthetic foam cushioning layer 30 of differing thickness around the elliptical core, so as to form a circular outer sectional contour. Thereby, when such a lamella 28 is oriented flat or horizontally as shown in FIGS. 2, 4, 5B and 6B, not only does the core 29 provide a more flexible support, but the additional thickness of the cushioning layer 30 on the upwardly facing side of the lamella 28 provides an additional softer cushioning effect. On the other hand, when such a lamella 28 is rotated to stand upright as shown in FIGS. 1, 3, 5A and 6A, the core 29 with the elliptical cross-section now provides a stiffer support, and also the reduced thickness of the cushioning layer 30 provides less of a resilient cushioning effect and therefore a harder or firmer support.

Figure 3:
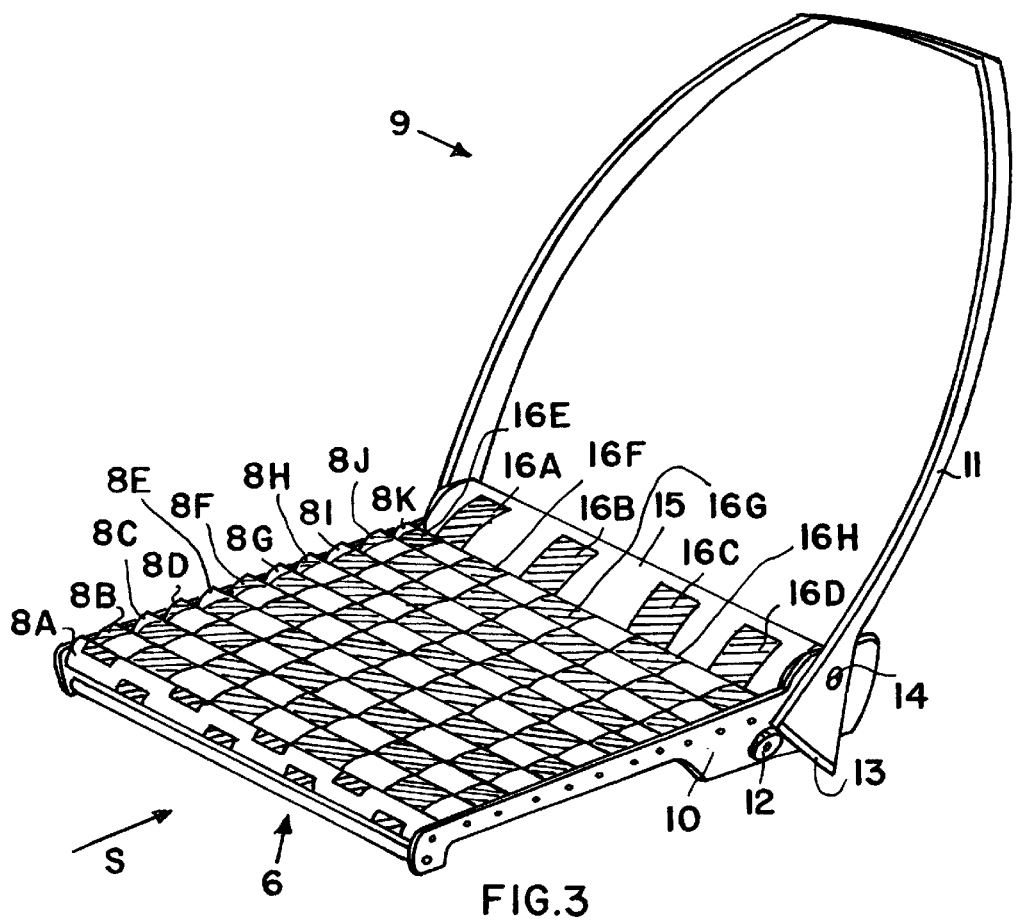
FIG. 3 is a schematic perspective view of a frame arrangement of the passenger seat in the upright seating configuration, with a seat bottom support and cushioning arrangement according to the invention.
Figure 4:
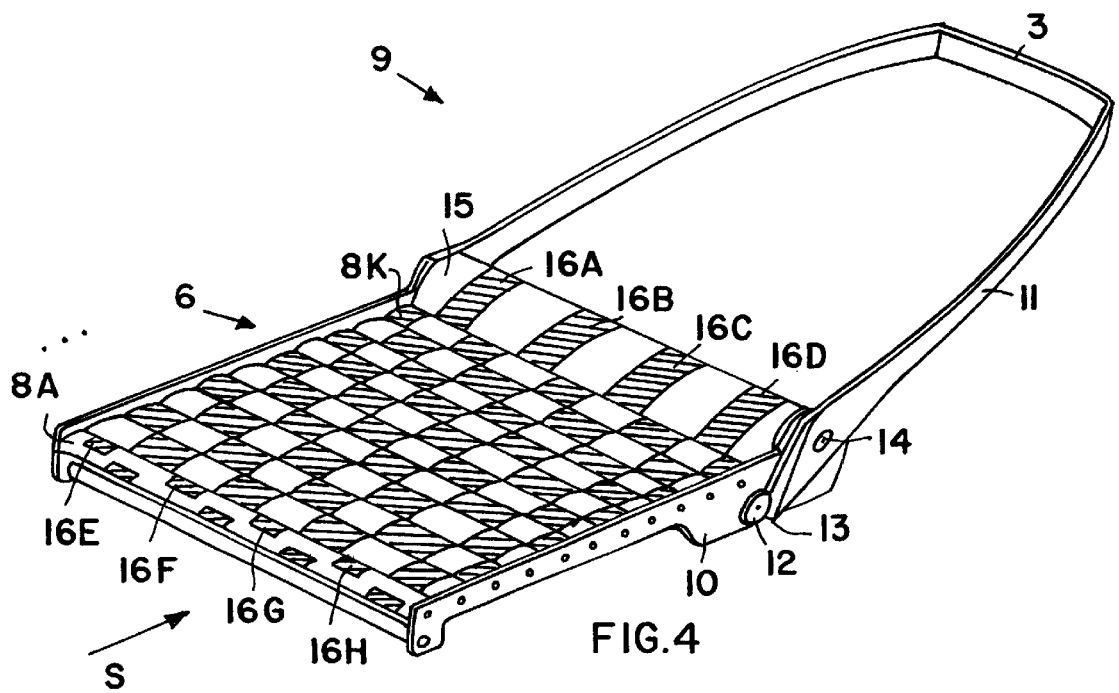
FIG. 4 is a schematic perspective view showing the frame arrangement according to FIG. 3, but adjusted into the reclining or lying configuration.

FIGS. 3 and 4 show a detail portion of a passenger seat arrangement 1, namely a frame arrangement 9 from which the upholstering and covering have been removed. The frame arrangement 9 includes a seat frame 10 and a backrest frame 11, which is adjustable, e.g. being pivotably connected to the seat frame 10, so that the backrest 3 can be reclined to bring the passenger seat arrangement 1 into the reclined lying position as shown in FIG. 4 from the upright seating configuration shown in FIG. 3. This reclining adjustment of the backrest 3 can be carried out electrically, mechanically, or by any other conventionally known adjustment mechanisms in the context of seat reclining adjustments, including both manual and automatic or semi-automatic mechanisms. The present example embodiment shows an exemplary drive element 12 such as a gear wheel 12 that can be driven by an electric motor or the like, so as to engage and drive a geared rack 13 or the like provided on the backrest frame 11, to thereby selectively recline or raise the backrest frame 11.

Preferably according to the invention, the adjustment of the firmness or stiffness of the seat support and cushion arrangement 6 is coupled to the tilting or reclining of the backrest frame 11, so that the seat cushioning and support stiffness or firmness is automatically adjusted together with or responsively to the reclining adjustment of the backrest 3. FIGS. 3 to 6 show an example of such a coupling of the adjustment of the seat support and cushioning arrangement 6 with the reclining mechanism of the backrest 3.

A shaft 15 is rigidly fixed to the backrest frame 11, and extends along the pivot axis 14 of the backrest 3. The seat support and cushioning lamellae 8 (including eleven lamellae 8A to 8K in the illustrated example embodiment) are arranged to extend parallel to each other and cross-wise relative to the seating arrangement longitudinal direction S, and are each rotatably supported and secured to the sides of the seat frame 10, so as to be rotatable respectively about the lengthwise rotation axes 8'. An operative interconnection between the shaft 15 and the seat support and cushioning lamellae 8A to 8K is established by means of several belts or straps 16.

In the illustrated embodiment, a total of eight straps 16A to 16H are provided, whereby these straps can be regarded as a first set of four straps 16A, 16B, 16C and 16D, and a second set of four straps 16E, 16F, 16G and 16H. Each set of straps is fixed at one end to the shaft 15, and then weaves in an undulating manner alternately above and below the seat support and cushioning lamellae 8A to 8K. Thereby, the first set of straps 16A, 16B, 16C and 16D will always be on an opposite side of each lamella 8, and on the opposite side of the shaft 15, relative to the second set of straps 16E, 16F, 16G and 16H. Thus, the overall effect is that of a woven configuration, with the straps 16A to 16H forming the warp that is alternately crossed over and under the lamellae 8 which form the weft.

Each strap 6 is secured to each lamella 8 at a respective attachment point 17. For example the straps 16A, 16B, 16C and 16D are each respectively connected or attached to each of the seat support and cushioning lamellae 8A to 8K at respective attachment points 17A, 17B, 17C and 17D. The locations of the attachment points 71A, 17B, 17C and 17D on the lamellae 8 are selected so that a partial rotation or pivoting of the shaft 15 about the pivot axis 14 during reclining of the backrest 3 will pull the straps 16A, 16B, 16C and 16D so that these in turn pull the respective seat support and cushioning lamellae 8 from the upright or vertical position shown in FIGS. 3, 5A and 6A, to the flat or horizontal position shown in FIGS. 4, 5B and 6B, by respectively correspondingly partially rotating or pivoting the lamellae 8 about their respective axes 8'.

Such a rotating or pivoting readjustment of the lamellae 8 about their axes 8' is carried out in a similar manner in the opposite rotation direction, by means of the second set of belts or straps 16E, 16F, 16G and 16H. Namely, when the backrest 3 is raised from the reclined position to an upright position, the shaft 15 rotates in the opposite direction from that described above, so as to slacken or pay out the straps 16A, 16B, 16C, and 16D while tightening or pulling the straps 16E, 16F, 16G and 16H, which are secured to the opposite side of the shaft 15 and in the opposite wrapping or winding direction. Similarly, the straps 16E, 16F, 16G and 16H are alternatingly woven around the successive lamellae 8 in a manner opposite the straps 16A, 16B, 16C and 16D, and are secured to the successive lamellae 8 at attachment points 17 respectively on the opposite side of the lamellae 8 relative to the attachment points 17 of the straps 16A, 16B, 16C and 16D.

With this arrangement, as the backrest 3 is raised, the shaft 15 rotates so as to pull the straps 16E, 16F, 16G and 16H while paying out the straps 16A, 16B, 16C and 16D as mentioned above, which causes all of the lamellae 8 to rotate from the flat or horizontal softer orientation shown in FIG. 6B to the upright or vertical firmer orientation shown in FIG. 6A. More particularly, FIGS. 6A and 6B show the transition from the firmer orientation of the seat support and cushioning lamellae 8 in FIG. 6A, to the softer orientation of the seat support and cushioning lamellae 8 in FIG. 6B. This transition involves reclining the backrest 3 from the upright position to the reclined position, which rotates the shaft 15 clockwise and pulls the straps or belts 16A, 16B, 16C and 16D as described above. This causes all of the lamellae 8 to rotate or pivot alternately counterclockwise and clockwise into the softer orientation as shown by the arrows in FIG. 6B.

It should be noted that FIGS. 6A and 6B only show the straps 16A, 16B, 16C and 16D for simplicity, while omitting the straps 16E, 16F, 16G and 16H. The second group of straps is fixed to the shaft 15 at a point diametrically opposite to the fixing point of the end of the first set of straps, and undulates around the lamellae 8 in a manner opposite the first set of straps. Thus, when the backrest 3 is again raised from the reclined position to the upright position, the process reverses from FIG. 6B to FIG. 6A, namely the shaft 15 rotates counterclockwise, thereby slackening the straps 16A, 16B, 16C and 16D, while pulling the straps 16E, 16F, 16G and 16H, which in turn rotates each of the lamellae 8 from the softer position shown in FIG. 6B back to the firmer position shown in FIG. 6A.

There are also alternative options for returning the seat support and cushioning lamellae 8 back to their firmer upright positions shown in FIG. 6A, For example, this can be achieved without providing a second set of straps 16E, 16F, 16G and 16H. Instead, only the first set of straps 16A, 16B, 16C and 16D may be provided to pull and thereby actively rotate the lamellae 8 from the firmer position of FIG. 6A to the softer position of FIG. 6B as discussed above. Then, one or more spring arrangements are provided in order to apply a spring bias to the seat support and cushioning lamellae 8, so as to rotate the lamellae 8 back into the firmer upright position shown in FIG. 6A. For example, a respective spiral spring can be incorporated into each seat support and cushioning lamellae 8, or into the rotational mounting thereof to the sides of the seat frame 10, to exert a rotational spring bias to the respective lamellae 8 in the direction opposite the arrows shown in FIG. 6B. With such an arrangement, when the straps 16A, 16B, 16C and 16D rotate the lamellae 8, they are doing so against the spring bias, and then hold the lamellae 8 in the softer position of FIG. 6B with the tension force of the straps. Then, when the backrest 3 is tilted upward, thereby rotating the shaft 15 and slackening the straps 16A, 16B, 16C and 16D, the spring force will rotate the lamellae in the opposite direction back to their neutral starting positions shown in FIG. 6A.

It is not necessary that all of the lamellae 8 must be outfitted with their own respective spring arrangement. Instead, at least only the forward-most lamella 8A at the front edge of the seat bottom 2 must comprise such a spring arrangement. Such a single spring arrangement will apply a spring return force to this first lamella 8A in the manner discussed above, which in turn will also correspondingly pull the straps 16A, 16B, 16C and 16D in the return direction, which will correspondingly pivot the other lamellae 8B to 8K back into the neutral initial position shown in FIG. 6A, due to the return pulling force of the straps 16A, 16B, 16C and 16D acting through the attachment points 17A, 173, 17C and 17D.

A further alternative option is that at least certain portions of the straps 16A, 16B, 16C and 16D are embodied to be elastically stretchable so as to exert an elastic return force on the lamellae 8. For example, the forward ends of the straps 16A, 16B, 16C and 16D may be secured to a fixed point on the forward edge of the seat frame 10 rather than being secured to the first lamellae 8A. The portion of these straps between the fixed end and the attachment to the first lamellae 8A is made elastic. This elastic portion stretches when the seat support and cushioning lamellae 8 are pivoted from the position of FIG. 6A into the position of FIG. 6B. Then, when the backrest 3 is returned to the upright position, the elastic portion of the straps 16 elastically retracts to its initial condition, thereby pulling the lamellae 8 from the configuration of FIG. 6B back into the configuration of FIG. 6A.

The above described passive spring arrangements can either entirely achieve the return pivoting of the lamellae 8, or may simply assist the return pivoting of the lamellae 8, which is further actively carried out, for example by the second set of straps 16E, 16F, 16G and 16H as discussed above.

The above described embodiment features involve a direct coupling of the adjustment of the seat bottom cushioning and support characteristic with the adjustment of the backrest reclining position through the straps 16 as a mechanical linkage. Alternatively, the drive that drives the backrest 3 into the desired reclining position, e.g. the driven gear wheel 12, can be connected through a separate transmission mechanism to also rotate the lamellae 8. For example, the ends of the lamellae 8 can be respectively fitted with gear wheels, which mesh together to form a gear train that is driven from the drive gear wheel 12. As a further alternative, the rotational position of the lamellae 8 can be manually adjusted, for example by means of a handwheel or hand lever that can be operated by the passenger sitting on the seat, and that is operatively linked to the lamellae 8 for rotating the lamellae 8. Such a manual adjustment can be independent of, or alternatively directly mechanically linked with, the reclining adjustment of the backrest 3. The direct mechanical linkage between these two adjustments is preferred for its simplicity and direct control.

The adjustable seat bottom support and cushion arrangement 6 shown and described in connection with the above embodiments is simply one application of the inventive arrangement. It is further possible to equip the backrest 3 with adjustable lamellae within the backrest frame 11 in order to be able to adjust the firmness of the backrest in a manner similar to that described above in connection with the seat bottom 2. Such an adjustability of the firmness of the backrest 3 can be provided in addition to or instead of the adjustability of the firmness of the seat bottom 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A seat arrangement for a person to sit or lie thereon, comprising:
   a seat bottom including a seat frame and a seat support and cushion arrangement supported by said seat frame; and
   a backrest including a backrest frame that is tiltably connected relative to said seat frame so that said backrest is selectively tiltably adjustable relative to said seat bottom, between a relatively upright position and a relatively reclined position;
   wherein said seat support and cushion arrangement has an adjustable support characteristic that is adjustable between a firmer characteristic and a softer characteristic, and includes mean for adjusting said support characteristic to said firmer characteristic in connection with and dependent on said backrest being adjusted to said relatively upright position and for adjusting said support characteristic to said softer characteristic in connection with and dependent on said backrest being adjusted to said relatively reclined position.

2. The seat arrangement according to claim 1, wherein said means for adjusting said support characteristic are connected as a positive link between said backrest and said seat support and cushioning arrangement, such that said support characteristic is adjusted to said firmer characteristic directly responsive to said backrest being adjusted to aid relatively upright position and such that said support characteristic is adjusted to said softer characteristic directly responsive to said backrest being adjusted to said relatively reclined position.

3. A seat arrangement for a person to sit or lie thereon, comprising:
   a seat bottom including a seat support and cushion arrangement having an adjustable support characteristic that is adjustable between a firmer characteristic and a softer characteristic;
   a backrest that is tiltably connected to said seat bottom so that said backrest is selectively tiltably adjustable relative to said sea bottom between a relatively upright position and a relatively reclined position; and
   a mechanical linkage that is connected between said backrest and said seat support and cushion arrangement such that said mechanical linkage adjusts said seat support and cushion arrangement to said firmer characteristic responsive to said backrest being adjusted to said relatively upright position, and such that said mechanical linkage adjusts said seat support an cushion arrangement to said softer characteristic responsive to said backrest being adjusted to said relatively reclined position.

4. The seat arrangement according to claim 3, wherein said seat bottom further includes a seat frame, said seat support and cushion arrangement comprises plural seat support rods that respectively extend parallel to each other crosswise across said seat bottom and that are pivotably supported by said seat frame so that each one of said support rods is pivotable about a lengthwise axis thereof, each one of said support rods has a relatively firmer axis orthogonal to said lengthwise axis and a relatively softer axis orthogonal to said lengthwise axis such that said support rods are firmer as to forces applied parallel to said firmer axis and softer as to forces applied parallel to said softer axis, and said mechanical linkage is connected to each one of said support rods so as to pivot said support rods about said lengthwise axes thereof responsive and linked to a tilting motion of said backrest.

5. The seat arrangement according to claim 4, wherein said mechanical linkage is connected to each of said support rods such that said support rods are all pivoted with said firmer axis oriented upright to establish said firmer characteristic and are all pivoted with said softer axis upright to establish said softer characteristic.

6. The seat arrangement according to claim 4, wherein said mechanical linkage comprises a shaft that is fixed to said backrest and arranged along a pivot axis about which said backrest is pivotably tiltable relative to said seat bottom, and said mechanical linkage further comprises at least one strap that is connected to said shaft and to each one of said support rods so as to pivot said support rods about said lengthwise axes thereof responsive to pivoting of said a shaft along with said backrest about said pivot axis.

7. A seat arrangement for a person to sit or lie thereon, comprising:
   a seat bottom including a seat frame, and a seat support and cushion arrangement having an adjustable support characteristic that is adjustable between a firmer characteristic and a softer characteristic; and
   a backrest that is tiltably connected to said seat bottom so that said backrest is selectively tiltably adjustable relative to said seat bottom between a relatively upright position and a relatively reclined position;
   wherein said seat support and cushion arrangement comprises plural seat support rods that respectively extend crosswise across said seat bottom, that are pivotably supported by said seat frame so that each one of said support rods is pivotable about a lengthwise axis thereof, and that are each respectively embodied so that pivoting said support rods about said lengthwise axes thereof adjusts said adjustable support characteristic of said seat support and cushion arrangement between said firmer characteristic and said softer characteristic.

8. The seat arrangement according to claim 7, further comprising a linkage that couples the pivoting of said seat support rods to tilting of said backrest relative to said seat bottom.

9. The seat arrangement according to claim 7, wherein each one of said seat support rods has a cross-sectional shape with a longer major axis and a shorter minor axis, wherein each one of said seat support rods exhibits a greater stiffness as to bending parallel to said major axis and a smaller stiffness as to bending parallel to said minor axis.

10. The seat arrangement according to claim 7, wherein each one of said seat support rods has a relatively firmer axis orthogonal to said lengthwise axis and a relatively softer axis orthogonal to said lengthwise axis such that said support rods are firmer as to forces applied parallel to said firmer axis and softer as to forces applied parallel to said softer axis.

11. The seat arrangement according to claim 7, wherein each one of said seat support rods has a cross-sectional shape that is oval, elliptical, rectangular, oblong or web-shaped.

12. The seat arrangement according to claim 7, further comprising at least one first strap that is connected to said backrest, extends meanderingly under and over alternating ones of said seat support rods from said backrest toward a front edge of said seat bottom opposite said backrest, and is connected at respective attachment points to said seat support rods.

13. The seat arrangement according to claim 12, wherein
   said backrest further comprises a backrest frame that is tiltably connected to said seat bottom so as to be pivotable relative thereto about a pivot axis, and a shaft that extends along said pivot axis and is rigidly fixed to said backrest frame so as to pivot therewith about said pivot axis;
   an end of said at least one first strap is connected to a circumference of said shaft so as to connect said strap to said backrest; and
   as said backrest is pivoted about said pivot axis from said relatively upright position to said relatively reclined position, said shaft pivots with said backrest frame and an end portion of said at least one first strap partially circumferentially wraps onto said circumference of said shaft such that said at leas one first strap is pulled toward said backrest and thereby pulls and pivots all of said seat support rods so as to adjust said support characteristic from said firmer characteristic to said softer characteristic.

14. The seat arrangement according to claim 13, further comprising at least one second strap that has an end connected to said circumference of said shaft at a location opposite said end of said at least one first strap, extends from said backrest toward said front edge of said seat bottom while passing meanderingly over and under alternating ones of said seat support rods respectively on an opposite side of each one of said rods relative to said at least one first strap, and is connected at respective attachment points to said seat support rods, so that as said backrest is pivoted about said pivot axis from said relatively reclined position to said relatively upright position, said shaft pivots with said backrest frame and an end portion of said at least one second strap partially circumferentially wraps onto said circumference of said shaft as said end portion of said at least one first strap unwraps from said circumference, such that said at least one second strap is pulled toward said backrest and thereby pulls and pivots all of said seat support rods so as to adjust said support characteristic from said softer characteristic to said firmer characteristic.

15. The seat arrangement according to claim 12, wherein pivoting said backrest from said relatively reclined position to said relatively upright position causes said seat support rods to pivot so as to adjust said support characteristic from said softer characteristic to said firmer characteristic.

16. The seat arrangement according to claim 15, further comprising a spring arrangement connected to at least a forwardmost one of said seat support rods that is closest to said front edge of said seat bottom, such that said spring arrangement exerts a rotational spring bias to said forwardmost support rod that urges said forwardmost support rod to pivot in a direction so as to adjust said support characteristic from said softer characteristic to said firmer characteristic.

17. The seat arrangement according to claim 12, wherein said at least one first strap has at least an elastically stretchable portion.

18. The seat arrangement according to claim 7, further comprising a footrest that is connected to and unrollably extendable from a front edge of said seat bottom opposite said backrest.

* * * * *